United States Patent
Zhao et al.

(10) Patent No.: US 10,321,512 B2
(45) Date of Patent: *Jun. 11, 2019

(54) SERVICE CONTROL METHOD, TERMINAL, AND NETWORK DEVICE

(71) Applicant: Huawei Device Co., Ltd., Dongguan (CN)

(72) Inventors: Xiaofei Zhao, Shenzhen (CN); Hai Lian, Shanghai (CN); Shujun Dang, Beijing (CN); Guoqiong Cao, Beijing (CN); Shenyun Zhang, Shanghai (CN); Haihong Lin, Shenzhen (CN); Xiaoyun Jing, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 129 days.

This patent is subject to a terminal disclaimer.

(21) Appl. No.: 15/199,188

(22) Filed: Jun. 30, 2016

(65) Prior Publication Data

US 2016/0316514 A1  Oct. 27, 2016

Related U.S. Application Data

(63) Continuation-in-part of application No. 14/586,203, filed on Dec. 30, 2014, now Pat. No. 9,408,069.
(Continued)

(30) Foreign Application Priority Data

Aug. 3, 2012 (CN) .......................... 2012 1 0275320

(51) Int. Cl.
*H04W 76/28* (2018.01)
*H04W 4/02* (2018.01)
(Continued)

(52) U.S. Cl.
CPC ........... *H04W 76/28* (2018.02); *H04W 4/027* (2013.01); *H04W 8/22* (2013.01); *H04W 24/08* (2013.01);
(Continued)

(58) Field of Classification Search
CPC ....... H04W 4/027; H04W 76/28; H04W 8/22; H04W 24/08
See application file for complete search history.

(56) References Cited

U.S. PATENT DOCUMENTS 9,307,436 B2 * 4/2016 Song ................. H04W 36/0088
9,913,277 B2 * 3/2018 Liu ..................... H04W 72/046
(Continued)

FOREIGN PATENT DOCUMENTS

| CN | 101583178 A | 11/2009 |
| CN | 101925161 A | 12/2010 |

(Continued)

OTHER PUBLICATIONS

Machine Translation and Abstract of Chinese Publication No. CN102014103A, Apr. 17, 2015, 9 pages.
(Continued)

*Primary Examiner* — Min Jung
(74) *Attorney, Agent, or Firm* — Conley Rose, P.C.

(57) ABSTRACT

A service control method, a terminal, and a network device. The method includes measuring, by a terminal, a service status of interaction between the terminal and a network and/or a moving speed of the terminal, and reporting, by the terminal, measured service status information and/or speed information to a network device such that the network device configures a network parameter of the terminal according to the service status information and/or the speed information. Therefore, a network throughput is improved, and terminal energy consumption is reduced.

21 Claims, 6 Drawing Sheets

Related U.S. Application Data which is a continuation of application No. PCT/CN2013/080814, filed on Aug. 5, 2013.

(51) Int. Cl.
*H04W 8/22* (2009.01)
*H04W 24/08* (2009.01)
H04W 24/10 (2009.01)
H04W 52/02 (2009.01)

(52) U.S. Cl.
CPC ........ *H04W 24/10* (2013.01); *H04W 52/0209* (2013.01); *Y02D 70/00* (2018.01); *Y02D 70/1224* (2018.01); *Y02D 70/1262* (2018.01); *Y02D 70/164* (2018.01); *Y02D 70/24* (2018.01)

(56) References Cited

U.S. PATENT DOCUMENTS

| | | | |
|---|---|---|---|
| 2004/0072559 A1 | 4/2004 | Kakumaru et al. | |
| 2005/0085279 A1 | 4/2005 | Aoki | |
| 2007/0019587 A1 | 1/2007 | Okamoto et al. | |
| 2009/0124249 A1 | 5/2009 | Young et al. | |
| 2010/0124934 A1* | 5/2010 | Mach | H04W 24/02 455/456.1 |
| 2010/0309798 A1 | 12/2010 | Fodor et al. | |
| 2011/0053630 A1 | 3/2011 | Higuchi | |
| 2011/0086635 A1* | 4/2011 | Grob-Lipski | H04W 36/32 455/423 |
| 2011/0287767 A1 | 11/2011 | Huang et al. | |
| 2013/0051227 A1 | 2/2013 | Aoyagi et al. | |
| 2013/0163497 A1* | 6/2013 | Wei | H04L 5/0007 370/311 |
| 2013/0170415 A1* | 7/2013 | Fukuta | H04W 52/0216 370/311 |
| 2014/0295770 A1* | 10/2014 | Song | H04W 24/10 455/67.11 |
| 2014/0295820 A1* | 10/2014 | Kim | H04W 52/0216 455/418 |
| 2014/0328239 A1* | 11/2014 | Takiguchi | H04W 52/0216 370/311 |
| 2015/0009816 A1* | 1/2015 | Hsu | H04W 28/0221 370/230.1 |
| 2015/0139053 A1* | 5/2015 | Van Lieshout | H04W 52/0216 370/311 |
| 2015/0148050 A1* | 5/2015 | Siomina | H04J 11/005 455/452.1 |
| 2015/0156615 A1* | 6/2015 | Gao | H04W 4/025 455/414.3 |
| 2016/0205628 A1* | 7/2016 | Konno | H04W 8/22 370/311 |
| 2017/0230780 A1* | 8/2017 | Chincholi | H04W 4/70 |
| 2018/0049269 A1* | 2/2018 | Fujishiro | H04W 76/048 |

FOREIGN PATENT DOCUMENTS

| | | |
|---|---|---|
| CN | 102014103 A | 4/2011 |
| CN | 102137383 A | 7/2011 |
| CN | 102137430 A | 7/2011 |
| CN | 102224745 A | 10/2011 |
| CN | 102572989 A | 7/2012 |
| CN | 102595440 A | 7/2012 |
| CN | 102624494 A | 8/2012 |
| CN | 102802188 A | 11/2012 |
| EP | 1628498 A2 | 2/2006 |
| EP | 2157830 A1 | 2/2010 |
| EP | 2395704 A1 | 12/2011 |
| EP | 2426980 A1 | 3/2012 |
| EP | 2515562 A1 | 10/2012 |
| JP | 2004128949 A | 4/2004 |
| JP | 20050130436 A | 5/2005 |
| JP | 2010050969 A | 3/2010 |
| JP | 2010530648 A | 9/2010 |
| JP | 2010538506 A | 12/2010 |
| JP | 2011504020 A | 1/2011 |
| JP | 2011228804 A | 11/2011 |
| JP | 2013524563 A | 6/2013 |
| JP | 2014502125 A | 1/2014 |
| WO | 2008156180 A1 | 12/2008 |
| WO | 2009119051 A1 | 10/2009 |
| WO | 2011116849 A1 | 9/2011 |
| WO | 2012092772 A1 | 7/2012 |
| WO | 2012096403 A1 | 7/2012 |

OTHER PUBLICATIONS

Machine Translation and Abstract of Chinese Publication No. CN101583178A, Part 1, Apr. 17, 2015, 78 pages.
Machine Translation and Abstract of Chinese Publication No. CN101583178A, Part 2, Apr. 22, 2015, 5 pages.
Machine Translation and Abstract of Chinese Publication No. CN102802188A, Part 1, Jan. 5, 2015, 8 pages.
Machine Translation and Abstract of Chinese Publication No. CN102802188A, Part 2, Jan. 5, 2015, 4 pages.
Machine Translation and Abstract of Japanese Publication No. JPA201050969, Mar. 4, 2010, 61 pages.
Machine Translation and Abstract of Japanese Publication No. JPA2010530648, Mar. 16, 2016, 5 pages.
Machine Translation and Abstract of Japanese Publication No. JPA2010538506, Mar. 16, 2016, 33 pages.
Machine Translation and Abstract of Japanese Publication No. JPA2013524563, Mar. 16, 2016, 134 pages.
Machine Translation and Abstract of Japanese Publication No. JPA2014502125, Mar. 16, 2016, 140 pages.
"Discussion on UE assistant information," 3GPP TSG-RAN WG2 Meeting #78, R2-122437, May 21-25, 2012, 4 pages.
"Measurement report on UE mobility state," 3GPP TSG-RAN WG2#61, R2-080819, Feb. 11-15, 2008, 1 page.
"UE mobility state reporting," 3GPP TSG-RAN WG2#61 bis, R2-081760, Mar. 31-Apr. 4, 2008, 1 page.
"Measurement for coverage optimization," 3GPP TSG-RAN WG2 Meeting #69bis, R2-102080, Apr. 12-16, 2010, 10 pages.
Foreign Communication From a Counterpart Application, European Application No. 13826028.6, Extended European Search Report dated Jun. 17, 2015, 12 pages.
Foreign Communication From a Counterpart Application, Application No. 2015-524627, Japanese Office Action dated Feb. 9, 2016, 6 pages.
Foreign Communication From A Counterpart Application, Application No. 2015-524627, English Translation of Japanese Office Action dated Feb. 9, 2016, 7 pages.
Foreign Communication From a Counterpart Application, Korean Application No. 10-2014-7037179, Korean Office Action dated Jan. 7, 2016, 6 pages.
Foreign Communication From a Counterpart Application, Korean Application No. 10-2014-7037179, English Translation of Korean Office Action dated Jan. 7, 2016, 4 pages.
Foreign Communication From a Counterpart Application, PCT Application No. PCT/CN2013/080814, English Translation of International Search Report dated Nov. 21, 2013, 2 pages.
Foreign Communication From a Counterpart Application, PCT Application No. PCT/CN2013/080814, English Translation of Written Opinion dated Nov. 21, 2013, 12 pages.
Foreign Communication From a Counterpart Application, Chinese Application No. 201210275320.9, Chinese Office Action dated Jun. 9, 2014, 9 pages.
Foreign Communication From a Counterpart Application, Chinese Application No. 201210275320.9, Chinese Office Action dated Mar. 9, 2015, 8 pages.
Foreign Communication From a Counterpart Application, Japanese Application No. 2016-135153, Japanese Office Action dated Jun. 20, 2017, 3 pages.
Foreign Communication From a Counterpart Application, Japanese Application No. 2016-135153, English Translation of Japanese Office Action dated Jun. 20, 2017, 4 pages.

(56) References Cited

OTHER PUBLICATIONS

Machine Translation and Abstract of Chinese Publication No. CN101925161, Dec. 22, 2010, 26 pages.
Machine Translation and Abstract of Chinese Publication No. CN102595440, Jul. 18, 2012, 53 pages.
Machine Translation and Abstract of Chinese Publication No. CN102624494, Aug. 1, 2012, 19 pages.
Machine Translation and Abstract of International Publication No. WO2012092772, Jul. 12, 2012, 80 pages.
Foreign Communication From a Counterpart Application, Chinese Application No. 201610211528.2, Chinese Office Action dated Jul. 5, 2018, 5 pages.

* cited by examiner

SERVICE CONTROL METHOD, TERMINAL, AND NETWORK DEVICE

CROSS-REFERENCE TO RELATED APPLICATIONS

This application is a continuation in part of U.S. patent application Ser. No. 14/586,203, filed on Dec. 30, 2014, which is a continuation of International Application No. PCT/CN2013/080814, filed on Aug. 5, 2013, which claims priority to Chinese Patent Application No. 201210275320.9, filed on Aug. 3, 2012, all of which are hereby incorporated by reference in their entireties.

TECHNICAL FIELD

The present disclosure relates to the field of communications technologies, and in particular, to a service control method, a terminal, and a network device.

BACKGROUND

With the wide application of smart multimedia mobile phones, terminal users use all types of communication and multimedia functions provided by the mobile phones more and more frequently.

In the prior art, a terminal usually sends parameters of a radio frequency module, such as a parameter of signal strength, to a network such that the network performs cell handover or transmission scheduling of the terminal according to the parameters. However, a network throughput is low and terminal energy consumption is large in the prior art.

SUMMARY

Embodiments of the present disclosure provide a service control method, a terminal, and a network device in order to improve a network throughput and reduce terminal energy consumption.

According to one aspect, an embodiment of the present disclosure provides a service control method, including measuring, by a terminal, a service status and/or a speed, reporting, by the terminal, measured service status information of interaction between the terminal and a network and/or moving speed information of the terminal to a network device such that the network device configures a network parameter of the terminal according to the service status information and/or the speed information.

An embodiment of the present disclosure further provides a service control method, including receiving, by a network device, service status information of interaction between a terminal and a network and/or moving speed information of the terminal reported by the terminal, and configuring, by the network device, a network parameter of the terminal according to the service status information and/or the speed information.

According to another aspect, an embodiment of the present disclosure further provides a terminal, which includes an interface module, and at least one of a measuring module and a service module, where the service module is configured to measure a service status of interaction between the terminal and a network. The measuring module is configured to measure a moving speed of the terminal, and the interface module is configured to report measured service status information and/or speed information to a network device such that the network device configures a network parameter of the terminal according to the service status information and/or the speed information.

An embodiment of the present disclosure further provides a network device, including an interface module configured to receive service status information of interaction between a terminal and a network and/or moving speed information of the terminal reported by the terminal, and a configuring module configured to configure a network parameter of the terminal according to the service status information and/or the speed information.

In the service control method, terminal, and network device provided in the embodiments of the present disclosure, the terminal can report its service status information and/or speed information to the network device, and the network device can configure a network parameter of the terminal according to the information, thereby improving a network throughput and reducing terminal energy consumption.

BRIEF DESCRIPTION OF DRAWINGS

To describe the technical solutions in the embodiments of the present disclosure more clearly, the following briefly introduces accompanying drawings required for describing the embodiments or the prior art. The accompanying drawings in the following description show some embodiments of the present disclosure, and a person of ordinary skill in the art may still derive other drawings according to these accompanying drawings without creative efforts.

DESCRIPTION OF EMBODIMENTS

Figure 1:
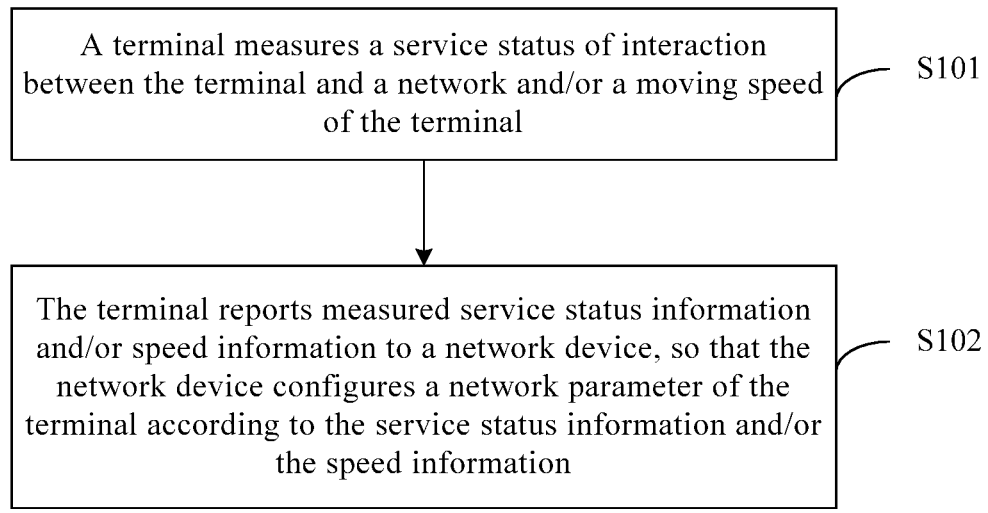
FIG. 1 is a flowchart of a service control method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The embodiments to be described are a part rather than all of the embodiments of the present disclosure. All other embodiments obtained by a person of ordinary skill in the art based on the embodiments of the present disclosure without creative efforts shall fall within the protection scope of the present disclosure.

Technologies described in this specification may be applied to various communications systems, for example, current second generation (2G) and third generation (3G)

communications systems and a next-generation communications system, such as a global system for mobile communications (GSM), a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, and other communications systems of these types.

A terminal in this application, that is, a user equipment (UE), may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or a UE.

A network device in this application may be a device independently deployed on a RAN, for example, a base station, or a radio network controller (RNC), or may also be a functional module in the foregoing devices on the RAN.

The network device may be a base station, for example, an access point. The base station may refer to a device in communication with a wireless terminal through one or more sectors at an air interface in an access network. The base station may be configured to mutually convert a received over-the-air frame and an Internet Protocol (IP) packet and serve as a router between the wireless terminal and a rest portion of the access network, where the rest portion of the access network may include an IP network. The base station may also coordinate attribute management of the air interface. For example, the base station may be a base station in GSM or CDMA (BTS), may also be a base station in WCDMA (NodeB), and may further be an evolved NodeB (eNB or e-NodeB) in the LTE, which is not limited in this application.

In addition, the terms "system" and "network" may often be used interchangeably in this specification. The term "and/or" in this specification describes only an association relationship for describing associated objects and represents that three relationships may exist. For example, A and/or B may represent the following three cases only A exists, both A and B exist, and only B exists. In addition, the character "/" in this specification generally indicates an "or" relationship between the associated objects.

FIG. 1 is a flowchart of a service control method according to an embodiment of the present disclosure. As shown in FIG. 1, the method includes the following steps:

Step S101: A terminal measures a service status of interaction between the terminal and a network and/or a moving speed of the terminal.

Step S102: The terminal reports measured service status information and/or speed information to a network device, so that the network device configures a network parameter of the terminal according to the service status information and/or the speed information.

As a possible implementation manner, the terminal may actively measure the service status of interaction between the terminal and the network and/or the moving speed of the terminal, and actively report its service status information and/or speed information to the network device.

As another possible implementation manner, the terminal may also measure the service status and/or the speed as requested by the network device, and report the measured service status information and/or speed information to the network device.

For example, the terminal may receive a report request sent by the network device, where the report request may be used to instruct the terminal to report the service status information and/or the speed information. Optionally, the terminal may send a report response to the network device, where the report response is used to represent that the terminal receives the report request and/or whether a report operation instructed by the report request is executed.

The terminal may measure its service status and/or speed after receiving the report request sent by the network device. Optionally, the service status information of the terminal may include one or any combination of the following information: start information of at least one service of the terminal, stop information of at least one service of the terminal, and data volume information of at least one service of the terminal. The terminal may measure service statuses of all types of services using a service module. Optionally, the speed information of the terminal may be measured using a speed measuring module of the terminal, such as a global positioning system (GPS), a gravity sensor, a gyroscope, an acceleration sensor, a proximity sensor, and a camera. It is understandable that, different types of terminals have different modules for measuring the speed, and so modules having a speed measuring function in terminals will not be listed one by one herein.

Optionally, the terminal may report the measured service status information and/or speed information to the network device periodically.

Optionally, the terminal may further report the measured service status information and/or speed information to the network device in an event triggering manner. That is, if a trigger condition is met, the terminal may report the measured service status information and/or speed information to the network device. The trigger condition may include one or any combination of at least one service of the terminal is started, at least one service of the terminal is closed, and a rate of the terminal exceeds a set threshold. It is understandable that, the terminal may set the trigger condition according to actual requirements.

Optionally, a cycle or a trigger condition for reporting the service status information and/or the speed information by the terminal may also be determined by the network device, and the network device carries information of the cycle or the trigger condition in the report request.

After the terminal reports the service status information and/or the speed information to the network device, the network device configures a connected discontinuous reception (CDRX) parameter of the terminal according to the service status information of the terminal, or according to the service status information and the speed information. The network device may further configure, according to the speed information of the terminal, a network parameter of the terminal, such as a CDRX parameter, a sounding parameter, a channel quality indicator (CQI) parameter, and a frequency selective channel, to improve a network throughput and reduce terminal energy consumption. The CDRX parameter may be a CDRX dormancy cycle.

Optionally, after the terminal measures the service status and/or the moving speed of the terminal, the terminal determines a CDRX parameter based on the service status information and/or the speed information, and reports the CDRX parameter to the network device, the network device configures the CDRX parameter for the terminal according to the received CDRX parameter.

Optionally, after the terminal measures the service status and/or the moving speed of the terminal, the terminal determines an index information according to the service status information and/or the speed information, and reports the index information to the network device, the network device configures a CDRX parameter of the terminal according to the index. The network device knows the corresponding CDRX parameter to the index information.

Optionally, after the terminal measures the service status and/or the moving speed of the terminal, the terminal determines a corrective information based on the service status information and/or the speed information, and reports correlative information of the service status information and/or the speed information to the network device, the network device configures a CDRX parameter of the terminal according to the correlative information. The above CDRX parameter and index determined by the terminal are two examples of the corrective information.

Optionally, the terminal may further receive a stop report request sent by the network device, where the stop report request is used to instruct the terminal to stop reporting the service status information and/or the speed information. After receiving the stop report request, the terminal may stop measuring the service status and/or the speed in order to stop reporting the service status information and/or the speed information to the network device.

According to the service control method, terminal, and network device provided in the embodiment, the terminal can report its service status information and/or speed information to the network device, and the network device can configure a network parameter of the terminal according to the information, thereby improving a network throughput and reducing terminal energy consumption.

Figure 2:
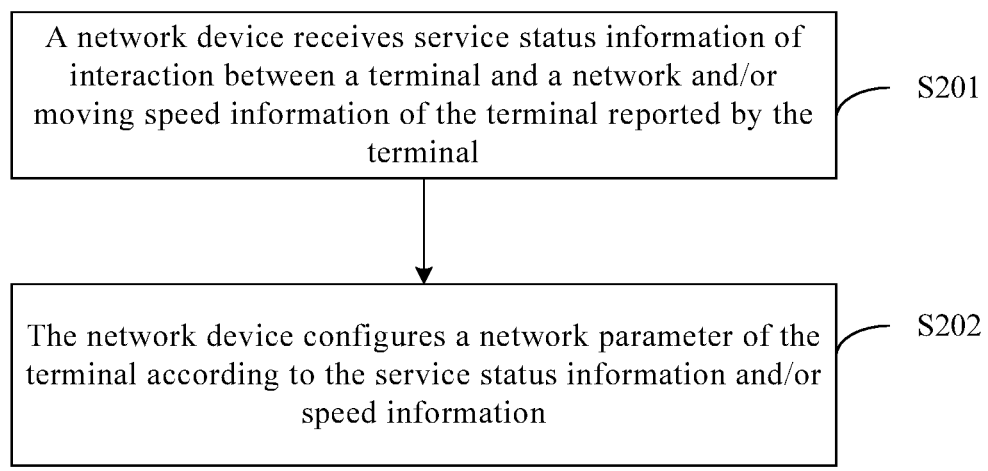
FIG. 2 is a flowchart of a service control method according to another embodiment of the present disclosure.

FIG. 2 is a flowchart of a service control method according to another embodiment of the present disclosure. As shown in FIG. 2, the method includes the following steps.

Step S201: A network device receives service status information of interaction between a terminal and a network and/or moving speed information of the terminal reported by the terminal.

Step S202: The network device configures a network parameter of the terminal according to the service status information and/or the speed information.

As a possible implementation manner, the network device may send a report request to the terminal, where the report request is used to instruct the terminal to report the service status information and/or the speed information in order to trigger the terminal to measure and report the service status information and/or the speed information.

Optionally, after sending the report request to the terminal, the network device may receive a report response sent by the terminal, where the report response is used to represent that the terminal receives the report request and/or whether a report operation instructed by the report request is executed.

Optionally, the network device may determine for the terminal a cycle or a trigger condition for reporting the service status information and/or the speed information, and carry the cycle or the trigger condition in the report request in order to trigger the terminal to report the service status information and/or the speed information.

After receiving the service status information and/or the speed information reported by the terminal, the network device may configure a network parameter of the terminal. Optionally, if the network device receives the service status information, or the service status information and the speed information reported by the terminal, the network parameter may be a CDRX parameter, and if the network device receives the speed information reported by the terminal, the network parameter may include one or any combination of a CDRX parameter, a sounding parameter, a CQI parameter, and a frequency selective channel.

As a possible implementation manner, the network device may dynamically configure the CDRX parameter of the terminal according to the speed information reported by the terminal, to save terminal energy consumption. The network may further configure a reasonable frequency selective channel and CQI parameter for the terminal according to the speed information reported by the terminal, to ensure performance of a frequency selective algorithm.

As another possible implementation manner, the network device may further determine a speed of the terminal according to the speed information, increase a sounding cycle of the terminal in a still state, and decrease a sounding cycle of the terminal with a speed exceeding a first set threshold. Therefore, a long sounding cycle is configured for the quiescent terminal in order to support more beam forming (BF) users with a same baseband processing resource, or improve a sounding bandwidth and improve BF performance. Further, for the terminal with the speed exceeding a certain threshold (the first set threshold), there is no BF gain for these users, and a long sounding cycle and a small sounding bandwidth are allocated in order to save sounding resource consumption.

As yet another possible implementation manner, the network device may further determine a speed of the terminal according to the speed information, increase a CDRX parameter of the terminal with a speed lower than a second set threshold or of the quiescent terminal, and decrease a CDRX parameter of the terminal with a speed higher than the second set threshold or set the CDRX parameter to 0. That is, a long CDRX parameter may be configured for a low-speed or quiescent terminal, and a short CDRX parameter may be configured for a high-speed terminal, and even the terminal may be controlled to exit a CDRX status.

As yet another possible implementation manner, the network device may further determine a speed of the terminal according to the speed information, and configure the frequency selective channel for the terminal with a speed higher than a third set threshold. That is, a frequency selective algorithm may be started for a low-speed terminal, to configure a frequency selective channel for the terminal, and a common scheduling algorithm may be adopted for a high-speed terminal.

The foregoing first set threshold, second set threshold, and third set threshold may be set according to specific requirements, and the foregoing thresholds may be the same or different.

As another possible implementation manner, in a scenario that the network device configures the network parameter of the terminal according to the service status information and the speed information reported by the terminal, if a CDRX parameter of the terminal determined by the network device according to the speed information is a first parameter, and a CDRX parameter of the terminal determined according to the service status information is a second parameter, the network device may configure the network parameter of the terminal to a smaller value between the first parameter and the second parameter.

As another possible implementation manner, the network device may configure different CDRX parameters according to different service status information reported by the terminal. For example, a 160 millisecond (ms) CDRX cycle may be configured for an instant messenger (IM) service, and a 320 ms CDRX cycle may be configured for an email, such as a GMAIL service in order to save terminal energy consumption.

Optionally, the network device may configure different CDRX parameters according to different correlative information reported by the terminal.

Optionally, the network device may configure different CDRX parameters according to different index information reported by the terminal.

Optionally, the network device may further send a stop report request to the terminal according to actual requirements for adjusting the network parameter of the terminal, and instruct, using the stop report request, the terminal to stop reporting the service status information and/or the speed information.

According to the service control method provided in the embodiment, a terminal can report its service status information and/or speed information to a network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

Figure 3:
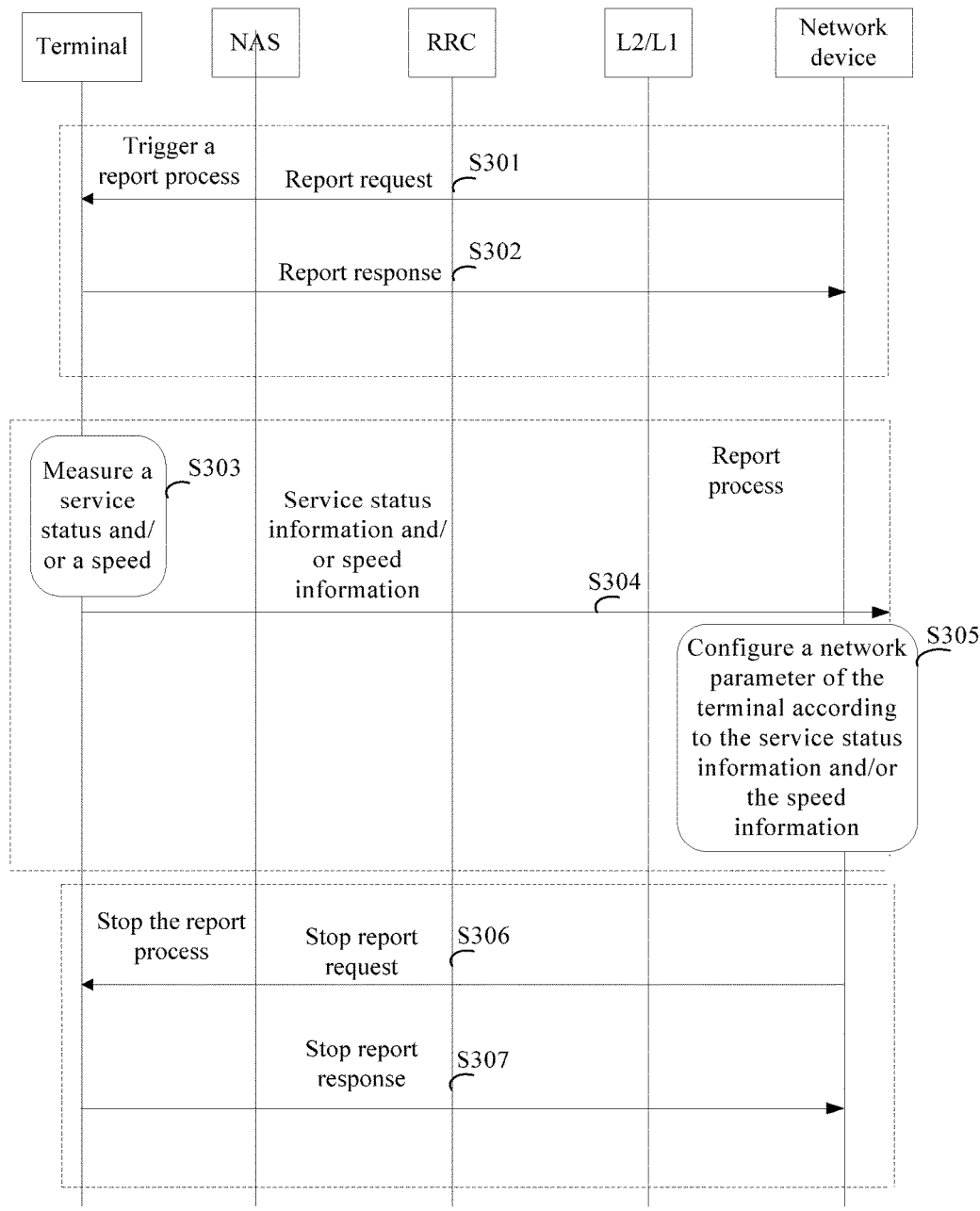
FIG. 3 is a flowchart of a service control method according to yet another embodiment of the present disclosure.

FIG. 3 is a flowchart of a service control method according to yet another embodiment of the present disclosure. As shown in FIG. 3, this embodiment provides an implementation scenario where a terminal and a network device interact to implement the service control method, and the method includes the following steps.

Step S301: The network device sends a report request to the terminal, where the report request is used to instruct the terminal to report service status information and/or speed information, or correlative information of the service status information and/or the speed information, or index information.

In the implementation scenario of this embodiment, the terminal is a UE, and the network device is an eNB, the UE is successfully registered, and a default bearer between the UE and a packet data network gateway (PGW) is established successfully.

In an implementation scenario, a data channel between the UE and the eNB is established, the report request sent by the eNB to the UE may be a network access server (NAS) message (a heartbeat service-type query and open request (UE apptype request) message), where the NAS message may be a newly-defined message for requesting the terminal to report the service status information. After receiving the NAS message, a radio resource control protocol (RRC) layer sends the NAS message to an NAS layer, and then sends the NAS message to an application layer (APP) through the NAS layer.

In another implementation scenario, the report request sent by the eNB to the UE may further be a terminal rate report request (UE Rate Report Request), for requesting the terminal to report the speed information. Similarly, after receiving the NAS message, the RRC layer sends the NAS message to the NAS layer, and then sends the NAS message to the APP layer through the NAS layer.

Step S302: The terminal sends a report response to the network device, where the report response is used to represent that the terminal receives the report request and/or whether a report operation instructed by the report request is executed.

In a scenario that the terminal receives the UE apptype request message, the terminal may send a service type query and open response (UE apptype Response) message to the network device, to represent that the terminal successfully receives the UE apptype request and starts to configure measurement of the service status of the terminal and performs the measurement according to the configuration.

Similarly, in a scenario that the terminal receives the UE Rate Report Request message, the terminal may send a terminal rate report response (UE Rate Report Response) message to the network device.

Step S303: The terminal measures a service status of interaction between the terminal and a network and/or a moving speed of the terminal.

Step S304: The terminal reports the service status information and/or the speed information, or correlative information of the service status information and/or the speed information, or index information, to the network device.

After the terminal receives the service status information and/or the speed information of the terminal, a private NAS message format may be formed in the NAS layer using the service status information and/or the speed information, and may be reported to the network device using a UE apptype report NAS message.

Step S305: The network device configures a network parameter of the terminal according to the service status information and/or the speed information, or correlative information of the service status information and/or the speed information, or index information.

Step S306: The network device sends a stop report request to the terminal, where the stop report request is used to instruct the terminal to stop reporting the service status information and/or the speed information, or correlative information of the service status information and/or the speed information, or index information.

Step S307: The terminal sends a report stop response to the network device, where the report stop response is used to represent that the terminal receives the stop report request.

For a process that the network device configures the network parameter of the terminal according to the service status information and/or the speed information, reference may be made to the relevant descriptions of the embodiment shown in FIG. 2 and details are not described herein again.

According to the service control method provided in the embodiment, a terminal can report its service status information and/or speed information to a network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

Figure 4:
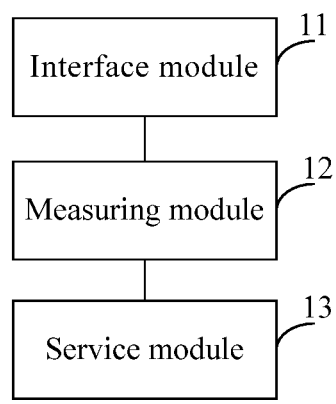
FIG. 4 is a schematic structural diagram of a terminal according to an embodiment of the present disclosure.

FIG. 4 is a schematic structural diagram of a terminal according to an embodiment of the present disclosure. As shown in FIG. 4, the terminal includes an interface module 11, and at least one of a measuring module 12 and a service module 13, where the service module 13 is configured to measure a service status of interaction between the terminal and a network, the measuring module 12 is configured to measure a moving speed of the terminal, and the interface module 11 is configured to report measured service status information and/or speed information, or correlative information of the service status information and/or the speed information, or index information, to a network device such that the network device configures a network parameter of the terminal according to the service status information and/or the speed information, or correlative information of the service status information and/or the speed information, or index information.

Optionally, the measuring module 12 may include one or any combination of a GPS module, a gravity sensor, a gyroscope, an acceleration sensor, a proximity sensor, and a camera.

Optionally, service status information measured by the service module 13 may include one or any combination of start information of at least one service of the terminal, stop information of at least one service of the terminal, and data volume information of at least one service of the terminal.

Optionally, the interface module 11 may be configured to report the measured service status information and/or speed information, or correlative information of the service status information and/or the speed information, or index information, to the network device periodically, or report measured service status information and/or speed information, or correlative information of the service status information and/or the speed information, or index information, to a network device if a trigger condition is met.

Optionally, the trigger condition may include one or any combination of at least one service of the terminal is started, at least one service of the terminal is closed, and the rate of the terminal exceeds a set threshold.

Optionally, the interface module 11 may further be configured to receive a report request sent by the network device, where the report request is used to instruct the terminal to report the service status information and/or the speed information.

Optionally, the interface module 11 may further be configured to send a report response to the network device, where the report response is used to represent that the terminal receives the report request and/or whether a report operation instructed by the report request is executed.

Optionally, the interface module 11 may further be configured to receive a stop report request sent by the network device, where the stop report request is used to instruct the terminal to stop reporting the service status information and/or the speed information.

Correspondingly, the service module 13 may further be configured to stop measuring the service status of the terminal, and the measuring module 12 may further be configured to stop measuring the speed of the terminal.

Figure 5:
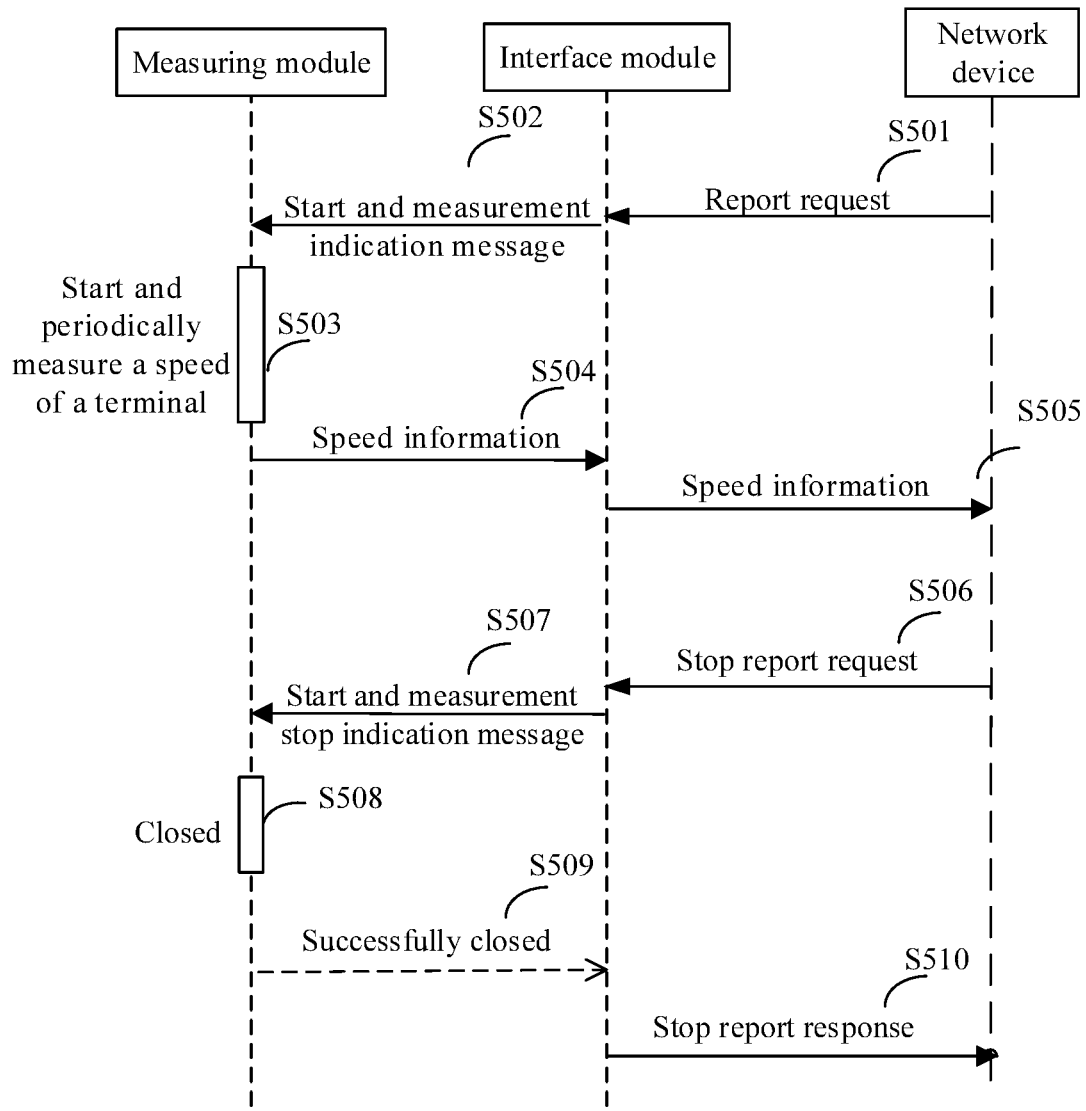
FIG. 5 is a flowchart of interaction between modules of a terminal according to an embodiment.

FIG. 5 is a flowchart of interaction between modules of a terminal according to an embodiment. As shown in FIG. 5, this embodiment provides a process that an interface module controls a measuring module to perform measurement, which includes the following steps.

Step S501: The interface module receives a report request sent by a network device.

The interface module may be a resident dump module in the terminal with an initial status of idle status. In the idle status, the interface module may receive the report request delivered by the network device, such as an eNB, where the report request may be a private NAS message. After processing the NAS message, the interface module may return to the idle status.

Step S502: The interface module delivers a start and measurement indication message to the measuring module.

Step S503: The measuring module is started and periodically measures a moving speed of the terminal.

The measuring module may enter a measurement state, and resolves a private NAS signaling start and measurement indication message. The start and measurement indication message may include a cycle length of periodic measurement.

Step S504: The measuring module reports speed information of the terminal to the interface module periodically.

Step S505: The interface module reports the speed information of the terminal to the network device periodically or when a trigger condition is met.

After receiving the speed information of the terminal reported by the measuring module, the interface module may enter a report processing state, and may report the speed information of the terminal to the network device using the private NAS message periodically or when the trigger condition is met.

Step S506: The interface module receives a stop report request sent by the network device.

Step S507: The interface module delivers a start and measurement stop indication message to the measuring module.

Step S508: The measuring module is closed.

Step S509: The measuring module reports to the interface module that the measuring module is successfully closed.

Step S510: The interface module reports a report stop response to the network device.

Figure 6:
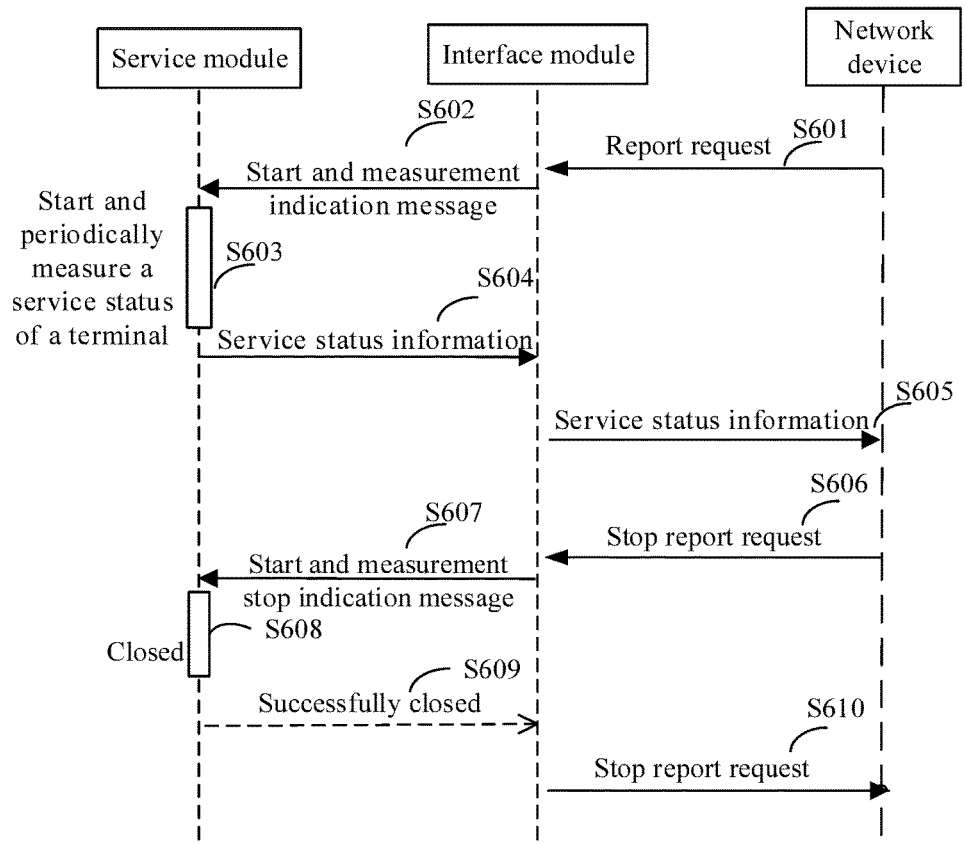
FIG. 6 is a flowchart of interaction between modules of a terminal according to another embodiment.

FIG. 6 is a flowchart of interaction between modules of a terminal according to another embodiment. As shown in FIG. 6, this embodiment provides a process that an interface module controls a service module to perform measurement, which includes the following steps.

Step S601: The interface module receives a report request sent by a network device.

Step S602: The interface module delivers a start and measurement indication message to the service module.

Step S603: The service module is started and periodically measures a service status of interaction between the terminal and a network.

Step S604: The service module reports service status information of the terminal to the interface module periodically.

Step S605: The interface module reports the service status information of the terminal to the network device periodically or when a trigger condition is met.

Step S606: The interface module receives a stop report request sent by the network device.

Step S607: The interface module delivers a start and measurement stop indication message to the service module.

Step S608: The service module stops measuring the service status information of the terminal.

Step S609: The service module reports to the interface module that the measuring module is successfully closed.

Step S610: The interface module reports a report stop response to the network device.

A process of steps S601 to S610 are similar to that of steps S501 to S510, reference may be made to relevant descriptions of steps S501 to S510, and details are not described herein again.

The terminal provided in the embodiment corresponds to the service control method provided in the embodiment of the present disclosure, and is a device for executing the service control method. For a specific process that the terminal executes the service control method, reference may be made to the method embodiments shown in FIG. 1 and FIG. 3, and details are not described herein again.

The terminal provided in the embodiment can report its service status information and/or speed information to a network device, and the network device can configure a network parameter of the terminal according to the information, thereby improving a network throughput and reducing terminal energy consumption.

Figure 7:
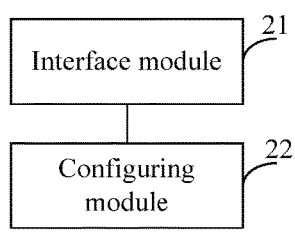
FIG. 7 is a schematic structural diagram of a network device according to an embodiment of the present disclosure.

FIG. 7 is a schematic structural diagram of a network device according to an embodiment of the present disclosure. As shown in FIG. 7, the network device includes an interface module 21 and a configuring module 22, where the interface module 21 is configured to receive service status information of interaction between a terminal and a network and/or moving speed information of the terminal, or correlative information of the service status information and/or the speed information, or index information, reported by the terminal, and the configuring module 22 is configured to configure a network parameter of the terminal according to the service status information and/or the speed information, or correlative information of the service status information and/or the speed information, or index information.

Optionally, if the interface module 21 receives the service status information, or the service status information and the speed information reported by the terminal, the network parameter is a CDRX parameter, and if the interface module 21 receives the speed information reported by the terminal, the network parameter may include one or any combination of a CDRX parameter, a sounding parameter, a CQI parameter, and a frequency selective channel.

Optionally, the configuring module 22 may be configured to determine a speed of the terminal according to the speed information, increase a sounding cycle of the terminal in a still state, and decrease a sounding cycle of the terminal with a speed exceeding a first set threshold, or determine a speed of the terminal according to the speed information, increase a CDRX parameter of the terminal with a speed lower than a second set threshold or of the quiescent terminal, and decrease a CDRX parameter of the terminal with a speed higher than the second set threshold or set the CDRX parameter to 0, or determine a speed of the terminal according to the speed information, and configure the frequency selective channel for the terminal with a speed higher than a third set threshold.

Optionally, the configuring module 22 may be configured to configure the CDRX parameter of the terminal according to the service status information of the terminal.

Optionally, the configuring module 22 may be configured to, if a CDRX parameter of the terminal determined according to the speed information is a first parameter, and a CDRX parameter of the terminal determined according to the service status information is a second parameter, configure the network parameter of the terminal to a smaller value between the first parameter and the second parameter.

Optionally, the interface module 21 may further be configured to send a report request to the terminal, where the report request is used to instruct the terminal to report the service status information and/or the speed information.

Optionally, the interface module 21 may further be configured to receive a report response sent by the terminal, where the report response is used to represent that the terminal receives the report request and/or whether a report operation instructed by the report request is executed.

Optionally, the interface module 21 may further be configured to send a stop report request to the terminal, where the stop report request is used to instruct the terminal to stop reporting the service status information and/or the speed information.

The network device provided in the embodiment corresponds to the service control method provided in the embodiment of the present disclosure, and is a device for executing the service control method. Reference may be made to the method embodiments shown in FIG. 2 and FIG. 3 for a specific process that the network device executes the service control method, and details are not described herein again.

According to the network device provided in the embodiment, a terminal can report its service status information and/or speed information to the network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

Figure 8:
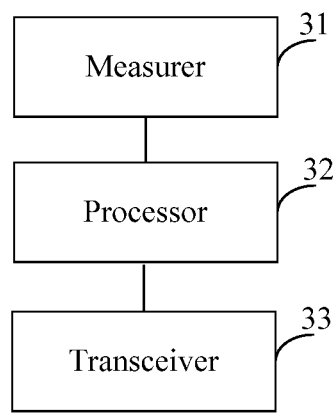
FIG. 8 is a schematic structural diagram of a terminal according to another embodiment of the present disclosure.

FIG. 8 is a schematic structural diagram of a terminal according to another embodiment of the present disclosure. As shown in FIG. 8, the terminal may be used to implement the service control methods provided in FIG. 1 and FIG. 3. The terminal may include a measurer 31, a processor 32, and a transceiver 33, where the measurer 31 is configured to measure a service status of interaction between the terminal and a network and/or moving speed of the terminal under the control of the processor 32, and send measured service status information and/or speed information, or correlative information of the service status information and/or the speed information, or index information, to the processor 32. The processor 32 is configured to control the measurer 31 to measure the service status and/or the speed, and control the transceiver 33 to report the service status information and/or the speed information measured by the measurer 31, or correlative information of the service status information and/or the speed information, or index information, to a network device, and the transceiver 33 is configured to report the service status information and/or the speed information, or correlative information of the service status information and/or the speed information, or index information, to the network device under the control of the processor 32 such that the network device configures a network parameter of the terminal according to the service status information and/or the speed information, or correlative information of the service status information and/or the speed information, or index information.

Optionally, the measurer 31 may include one or any combination of a GPS module, a gravity sensor, a gyroscope, an acceleration sensor, a proximity sensor, and a camera.

Optionally, the service status information may include one or any combination of start information of at least one service of the terminal, stop information of at least one service of the terminal, and data volume information of at least one service of the terminal.

Optionally, the processor 32 may be configured to control the transceiver 33 to report the measured service status information and/or speed information to the network device periodically, or control the transceiver 33 to report the measured service status information and/or speed information to the network device if a trigger condition is met.

Optionally, the trigger condition may include one or any combination of at least one service of the terminal is started, at least one service of the terminal is closed, and the rate of the terminal exceeds a set threshold.

Optionally, the transceiver 33 may further be configured to receive a report request sent by the network device, and send the report request to the processor 32, where the report request is used to instruct the terminal to report the service status information and/or the speed information, or correlative information of the service status information and/or the speed information, or index information.

Correspondingly, the processor 32 may further be configured to control the measurer 31 to measure the service status and/or the speed according to the report request, and may further be configured to control the transceiver 33 to send a report response to the network device, where the report response is used to represent that the terminal receives the report request and/or whether a report operation instructed by the report request is executed.

The transceiver 33 may further be configured to send a report response to the network device under the control of the processor 32.

Optionally, the transceiver 33 may further be configured to receive a stop report request sent by the network device, and send the stop report request to the processor 32, where the stop report request is used to instruct the terminal to stop reporting the service status information and/or the speed information.

Correspondingly, the processor 32 may further be configured to control, according to the stop report request, the measurer 31 to stop measuring the service status of the terminal, and the measurer 31 may further be configured to stop, under the control of the processor 32, measuring the status information and/or the speed of the terminal.

The terminal provided in the embodiment corresponds to the service control method provided in the embodiment of the present disclosure, and is a device for executing the service control method. Reference may be made to the method embodiments shown in FIG. 1 and FIG. 3 for a specific process that the terminal executes the service control method, and details are not described herein again.

The terminal provided in the embodiment can report its service status information and/or speed information to a network device, and the network device can configure a network parameter of the terminal according to the information, thereby improving a network throughput and reducing terminal energy consumption.

Figure 9:
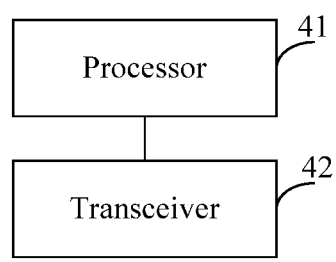
FIG. 9 is a schematic structural diagram of a network device according to another embodiment of the present disclosure.

FIG. 9 is a schematic structural diagram of a network device according to another embodiment of the present disclosure. As shown in FIG. 9, the network device includes a transceiver 42 and a processor 41, where the transceiver 42 is configured to receive service status information of interaction between a terminal and a network and/or moving speed information of the terminal, or correlative information of the service status information and/or the speed information, or index information, reported by the terminal, and the processor 41 is configured to configure a network parameter of the terminal according to service status information and/or speed information, or correlative information of the service status information and/or the speed information, or index information.

Optionally, if the transceiver 42 receives the service status information, or the service status information and the speed information reported by the terminal, the network parameter may be a CDRX parameter, and if the transceiver 42 receives the speed information reported by the terminal, the network parameter may include one or any combination of a CDRX parameter, a sounding parameter, a CQI parameter, and a frequency selective channel.

Optionally, the processor 41 may be configured to determine a speed of the terminal according to the speed information, increase a sounding cycle of the terminal in a still state, and decrease a sounding cycle of the terminal with a speed exceeding a first set threshold, or determine a speed of the terminal according to the speed information, increase a CDRX parameter of the terminal with a speed lower than a second set threshold or of the quiescent terminal, and decrease a CDRX parameter of the terminal with a speed higher than the second set threshold or set the CDRX parameter to 0, or determine a speed of the terminal according to the speed information, and configure the frequency selective channel for the terminal with a speed higher than a third set threshold.

Optionally, the processor 41 may be configured to configure the CDRX parameter of the terminal according to the service status information of the terminal.

Optionally, the processor 41 may be configured to, if a CDRX parameter of the terminal determined according to the speed information is a first parameter, and a CDRX parameter of the terminal determined according to the service status information is a second parameter, configure the network parameter of the terminal to a smaller value between the first parameter and the second parameter.

Optionally, the transceiver 42 may further be configured to send a report request to the terminal, where the report request is used to instruct the terminal to report the service status information and/or the speed information.

Optionally, the transceiver 42 may further be configured to receive a report response sent by the terminal, where the report response is used to represent that the terminal receives the report request and/or whether a report operation instructed by the report request is executed.

Optionally, the transceiver 42 may further be configured to send a stop report request to the terminal, where the stop report request is used to instruct the terminal to stop reporting the service status information and/or the speed information.

The network device provided in the embodiment corresponds to the service control method provided in the embodiment of the present disclosure, and is a device for executing the service control method. Reference may be made to the method embodiments shown in FIG. 2 and FIG. 3 for a specific process that the network device executes the service control method, and details are not described herein again.

According to the network device provided in the embodiment, a terminal can report its service status information and/or speed information to the network device, and the network device can configure a network parameter of the terminal according to the information, and can configure the network parameter of the terminal such as a CDRX parameter of the terminal, a sounding parameter, a CQI parameter, and a frequency selective channel, thereby improving a network throughput and reducing terminal energy consumption.

A system according to another embodiment of the present disclosure includes above network device and above terminal. According to the system provided in the embodiment, the terminal can report its service status information and/or speed information, or correlative information of the service status information and/or the speed information, or index information, to the network device, and the network device can configure a network parameter for the terminal according to the information.

It may be clearly understood by persons skilled in the art that, for the purpose of convenient and brief description, only division of the above functional modules is illustrated. In a practical application, the above functions can be allocated to different functional modules for implementation as required. That is, the internal structure of the apparatus is divided into different functional modules to implement all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A system for configuring a connected discontinuous reception (CDRX) cycle for a terminal, comprising:
    a network device; and
    the terminal in communication with the network device, the terminal comprising:
        a processor, and
        a measurer coupled to the processor and configured to:
            measure a service status of a terminal service and a terminal moving speed under control of the processor, and
            send a service status information and a moving speed information to the processor, the service status information indicating the service status of the terminal service, and the moving speed information indicating the terminal moving speed,
        a transceiver coupled to the processor and configured to report the service status information and the moving speed information to the network device under the control of the processor,
    wherein the network device is configured to configure the CDRX cycle for the terminal according to the service status information and the moving speed information, and
    wherein the network device comprises:
        another transceiver configured to receive the service status information and the moving speed information reported by the terminal; and
        another processor coupled to the transceiver and configured to configure the CDRX cycle for the terminal in accordance with the service status information and the moving speed information, the CDRX cycle indicating a CDRX dormancy cycle.

2. The system of claim 1, wherein the transceiver is further configured to:
    send a report request to the terminal, the report request instructing the terminal to report the service status information of the terminal service and the moving speed information of the terminal; and
    receive a report response from the terminal, the report response indicating that the terminal has received the report request or whether a report operation instructed by the report request has been executed.

3. The system of claim 2, wherein the transceiver is further configured to send a stop report request to the terminal, the stop report request instructing the terminal to stop reporting the service status information and the moving speed information.

4. The system of claim 1, wherein the CDRX cycle is configured to be a lesser of a first value determined according to the moving speed information and a second value determined according to the service status information.

5. The system of claim 1, wherein the service status information comprises at least one of a start information of at least one terminal service, a stop information of at least one terminal service, or a data volume information of at least one terminal service.

6. The system of claim 1, wherein the measurer comprises one or any combination of a global positioning system (GPS), a gravity sensor, a gyroscope, an acceleration sensor, a proximity sensor, or a camera.

7. The system of claim 1, wherein the transceiver is further configured to:
    report the service status information and the moving speed information to the network device periodically; and report the service status information and the moving speed information to the network device when a trigger condition is met.

8. The system of claim 7, wherein the trigger condition comprises one or any combination of at least one terminal service is started, at least one terminal service is closed, or a rate of the terminal exceeds a set threshold.

9. A terminal for configuring a connected discontinuous reception (CDRX) cycle, comprising:
   a measurer,
   a transceiver, and
   a processor coupled to the measurer and the transceiver and configured to:
      measure, via the measurer, a service status of a terminal service and a terminal moving speed;
      control the transceiver to report a service status information and a moving speed information to a network device, the service status information indicating the service status of the terminal service, and the moving speed information indicating the terminal moving speed;
      report, via the transceiver, the service status information and the moving speed information to the network device, the CDRX cycle indicating a CDRX dormancy cycle.

10. The terminal of claim 9, wherein the CDRX cycle is configured to be a lesser of a first value determined according to the moving speed information and a second value determined according to the service status information.

11. The terminal of claim 9, wherein the measurer comprises one or any combination of a global positioning system (GPS), a gravity sensor, a gyroscope, an acceleration sensor, a proximity sensor, and a camera.

12. The terminal of claim 9, wherein the service status information comprises at least one of a start information of at least one terminal service, a stop information of at least one terminal service, or a data volume information of at least one terminal service.

13. The terminal of claim 9, wherein the processor is further configured to:
   report, via the transceiver, the service status information and the moving speed information to the network device periodically; and
   report, via the transceiver, the service status information and the moving speed information to the network device when a trigger condition is met.

14. The terminal of claim 13, wherein the trigger condition comprises one or any combination of at least one terminal service is started, at least one terminal service is closed, or a rate of the terminal exceeds a set threshold.

15. The terminal of claim 9, wherein the processor is further configured to:
   receive, via the transceiver, a report request from the network device, the report request being used to instruct the terminal to report the service status information and the moving speed information; and
   send a report response to the network device, the report response being used to indicate that the terminal receives the report request or whether a report operation instructed by the report request is executed.

16. The terminal of claim 15, wherein the transceiver is further configured to receive a stop report request from the network device, the stop report request being used to instruct the terminal to stop reporting the service status information and the moving speed information.

17. A network device for configuring a connected discontinuous reception (CDRX) cycle for a terminal, comprising:
   a transceiver configured to receive service status information of a terminal service and a moving speed information of the terminal reported by the terminal, the moving speed information indicating a terminal moving speed; and
   a processor coupled to the transceiver and configured to configure the CDRX cycle for the terminal in accordance with the service status information and the moving speed information, the CDRX cycle indicating a CDRX dormancy cycle.

18. The network device of claim 17, wherein the transceiver is further configured to:
   send a report request to the terminal, the report request instructing the terminal to report the service status information of the terminal service and the moving speed information;
   receive a report response from the terminal, the report response indicating that the terminal has received the report request or whether a report operation instructed by the report request has been executed.

19. The network device of claim 18, wherein the transceiver is further configured to send a stop report request to the terminal, and wherein the stop report request instructs the terminal to stop reporting the service status information and the moving speed information.

20. The network device of claim 17, wherein the CDRX cycle is configured to be a lesser of a first value determined according to the moving speed information and a second value determined according to the service status information.

21. The network device of claim 17, wherein the service status information comprises at least one of a start information of at least one terminal service, a stop information of at least one terminal service, or a data volume information of at least one terminal service.

* * * * *